United States Patent
Eu et al.

(10) Patent No.: US 8,441,598 B2
(45) Date of Patent: May 14, 2013

(54) LIQUID CRYSTAL DISPLAY DEVICE

(75) Inventors: Jung-Tack Eu, Paju Si (KR);
Sung-Joong Kim, Paju Si (KR)

(73) Assignee: LG Display Co. Ltd., Seoul (KR)

( * ) Notice: Subject to any disclaimer, the term of this patent is extended or adjusted under 35 U.S.C. 154(b) by 915 days.

(21) Appl. No.: 12/338,660

(22) Filed: Dec. 18, 2008

(65) Prior Publication Data
US 2009/0201439 A1 Aug. 13, 2009

(30) Foreign Application Priority Data
Feb. 12, 2008 (KR) .................. 10-2008-0012738

(51) Int. Cl.
*G02F 1/1335* (2006.01)

(52) U.S. Cl.
USPC .......................................................... 349/70

(58) Field of Classification Search ............ 349/70
See application file for complete search history.

(56) References Cited

U.S. PATENT DOCUMENTS

| | | | | |
|---|---|---|---|---|
| 6,326,728 B1 * | 12/2001 | Cheng et al. | .................. | 313/623 |
| 6,326,738 B1 * | 12/2001 | McAndrew | ............... | 315/227 R |
| 7,839,069 B2 * | 11/2010 | Nakanishi et al. | ............ | 313/493 |
| 2007/0230169 A1 * | 10/2007 | Kwon et al. | .................. | 362/217 |

FOREIGN PATENT DOCUMENTS

| | | |
|---|---|---|
| CN | 101051142 A | 10/2007 |
| KR | 1020050060232 A | 6/2005 |
| KR | 1020070023324 A | 2/2007 |

OTHER PUBLICATIONS

Office Action issued in corresponding Chinese Patent Application No. 200810185660.6; issued May 11, 2010.
Office Action issued in corresponding Korean Patent Application No. 10-2008-0012738, mailed Dec. 18, 2012.

* cited by examiner

*Primary Examiner* — Phu Vu
(74) *Attorney, Agent, or Firm* — Brinks Hofer Gilson & Lione

(57) ABSTRACT

Disclosed is a liquid crystal display device equipped with a balance insulating member having a bottom frame and lamp sockets integrally formed on the bottom frame, including: a lower cover; a plurality of lamps disposed on the lower cover with a certain interval therebetween; a balance insulating member disposed at both sides of the lower cover, and having a bottom frame and lamp sockets integrally formed on the bottom frame so as to be coupled to the lamps; and a liquid crystal panel disposed above the lamps and receiving light, wherein the balance insulating member includes conductive electrodes formed at the lamp sockets, ballast capacitors each connected to the conductive electrodes and disposed on an upper side of the bottom frame, and conductive wirings formed inside the bottom frame and connected to the ballast capacitors.

9 Claims, 6 Drawing Sheets

LIQUID CRYSTAL DISPLAY DEVICE

BACKGROUND

1. Field of the Disclosure

The present invention relates to a liquid crystal display device, and more particularly, to a liquid crystal display device equipped with a balance insulating member having a bottom frame and lamp sockets integrally formed on the bottom frame.

2. Description of the Related Art

Generally, a liquid crystal display (LCD) device is being widely used due to its advantages of light weight, thin thickness, low power consumption and the like. Accordingly, the LCD device is being widely used to display images on screens of portable computers, audio/video equipment, and office automation equipment. The LCD device displays desired images on a screen by controlling optical transmittance according to image signals applied to a plurality of controlling switching devices arranged in a matrix format.

However, since the liquid crystal display device does not have a self light-emitting characteristic, a separate device for supplying light to the liquid crystal panel, called a "backlight unit," is needed. As an optical source for emitting light, a Cold Cathode Fluorescence Lamp (CCFL) is generally used. The CCFL is a light source tube which uses a cold cathode emission phenomenon, wherein an electron is emitted when a strong electric field is applied onto a cathode surface, and is widely used because it has the advantages of having low heat generation, high luminance, long lifetime, a full color spectrum and the like. Accordingly, the liquid crystal display device using such CCFL has been equipped with a direct-type backlight unit using a plurality of CCFLs, considering a recent trend of increasing the size of the display devices.

In the direct-type backlight unit, if a plurality of CCFLs is driven in parallel by using a transformer, only some of the plurality of CCFLs would be driven due to an electric discharge characteristic of the CCFL. That is, while the CCFL has an infinite resistance value before it discharges, the CCFL has a small resistance value after it discharges due to the formation of plasma of a conductor inside a glass tube. Accordingly, the resistance value after the CCFL discharges would become more reduced than that of an initial stage, thereby increasing an amount of a current. Therefore, when the plurality of the CCFLs are driven in parallel, the current flows toward CCFLs having a smaller resistance value after the initial electrical discharge, thereby causing some of the CCFLs to be driven and others not to be driven.

In order to solve such problems, a lamp driving apparatus for a liquid crystal display device has been disclosed in which a ballast capacitor, a capacitor of equal capacitance, is attached to both electrodes of each CCFL, thereby forming an equivalent circuit which is the same as an External Electrode Fluorescent Lamp (EEFL), thus to enable a parallel-driving of the plurality of CCFLs by using one transformer. Here, the EEFL is lighted when an AC power is applied to an external electrode, i.e., an electric discharge occurs in a discharge space inside the glass tube by an electric field due to a high frequency voltage which is applied to a pair of external electrodes, and by an ultraviolet light generating due to this electric discharge, a fluorescent substance coated on an inner circumferential surface of the glass tube emits and generates a visible ray.

Description of a balance PCB where the ballast capacitor is formed will be given.

FIG. 1 is a cross-sectional view showing a construction of a direct-type liquid crystal display device according to the related art.

As shown in FIG. 1, a reflecting plate 42 is attached onto a lower cover 41 so as to reflect light from a plurality of lamps 48 serving as a light source to a front surface.

Balance PCBs 49a and 49b for coupling a plurality of CCFLs are provided at both sides of the lower cover 41. Inverter PCBs 50a and 50b for applying an AC voltage are respectively connected to the balance PCBs 49a and 49b, which will be described later.

In addition, a diffusion plate 43 for uniformly spreading light from the lamps 48 to the front surface through the reflecting plate 42, and optical sheets 44 including a prism sheet and a protective sheet for enhancing an optical function of the light transmitted through the diffusion plate 43, are disposed above the lamps 48.

With such configuration of the backlight unit, a main support (not shown) is provided so as to maintain an overall support of the liquid crystal display device. Here, the main support is formed to have a stepped portion in a certain pattern on an upper surface thereof, in consideration of a liquid crystal panel 20 to be disposed thereon.

The liquid crystal panel 20 disposed on the main support is formed by multiple unit processes. That is, the liquid crystal panel 20 may include a Thin Film Transistor (TFT) array substrate 20a having thin film transistors arranged in each unit pixel, a color filter substrate 20b having a color filter for implementing a color, and a liquid crystal injected between the two substrates.

An upper cover (not shown) is configured to surround an outer edge of the liquid crystal panel 20 as well as side surfaces of the main support, and to be coupled to the lower cover 41 through a separate coupling means (e.g., a hook, etc.).

FIG. 2 is a perspective view showing a backlight unit according to the related art, specifically, a balance PCB and an inverter PCB on a lower cover.

Referring to FIG. 2, the inverter PCBs 50a and 50b are configured to convert a DC power supplied from an external source into an AC voltage, and convert the AC voltage into an AC voltage of a high voltage. The high AC voltage is applied to the balance PCBs 49a and 49b through an output connector of the inverter PCBs 50a and 50b, controlled an integrated circuit.

And, the high AC voltage applied to the balance PCBs 49a and 49b is supplied to respective ballast capacitors 49a1 and 49b1 through conductive wires and high voltage supply pattern (or wiring) such that a uniform amount of current is introduced into each tube of a plurality of the lamps 48 (e.g., CCFL, etc.). Then, the current is introduced into the lamps 48 connected to the respective ballast capacitors 49a1 and 49b1.

In such direct-type liquid crystal display device according to the related art, the balance PCB is mounted on the lower cover so as to stably supply a current to each of the lamps. However, the lamps are fixed to the balance PCBs by soldering, thereby reducing operation efficiency and increasing a manufacturing cost.

In addition, since a high voltage for driving the lamps is applied to the balance PCBs (or wire on the balance PCBs) provided on the lower cover, a separate insulation sheet for electrically insulating the lower cover formed of a metallic material needs to be provided while maintaining a safety distance, thereby causing the increase in the manufacturing cost.

In addition, in order to assemble (or fix) the balance PCB on the lower cover, through holes are formed on the balance PCB in a manufacturing process. Here, foreign substances may be introduced into the through holes, thereby deteriorating an external appearance of the liquid crystal display device.

By having the balance PCB on the lower cover, an outer edge of a screen on which an image is not implemented, i.e., a bezel area, becomes larger, thereby being unable to appropriately meet consumer needs, which may lead to a reduced demand in the liquid crystal display device.

BRIEF SUMMARY

In one embodiment a liquid crystal display device includes: a lower cover; a plurality of lamps disposed on the lower cover with a certain interval therebetween; a balance insulating member disposed at both sides of the lower cover, and having a bottom frame and lamp sockets integrally formed on the bottom frame so as to be coupled to the lamps; and a liquid crystal panel disposed above the lamps and receiving light, wherein the balance insulating member includes conductive electrodes formed at the lamp sockets, ballast capacitors each connected to the conductive electrodes and disposed on an upper side of the bottom frame, and conductive wirings formed inside the bottom frame and connected to the ballast capacitors.

In another embodiment, a liquid crystal display device includes: a lower cover having through holes with a certain interval at both sides thereof; a plurality of lamps arranged with a certain interval on the lower cover; a balance insulating member having a bottom frame disposed at both sides of a lower surface of the lower cover, and lamp sockets integrally formed on the bottom frame and coupled to the through holes of the lower cover so as to be coupled to the respective lamps; and a liquid crystal panel disposed above the lamps and receiving light, wherein the balance insulating member includes conductive electrodes formed at the lamp sockets, ballast capacitors each connected to the conductive electrodes and disposed on a lower side of the bottom frame, and conductive wirings formed inside the bottom frame and connected to the ballast capacitors.

The foregoing and other objects, features and aspects of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention, in which.

DETAILED DESCRIPTION OF THE DRAWINGS AND THE PRESENTLY PREFERRED EMBODIMENTS

Description of the preferred embodiments of the present invention will be given in more detail, examples of which are illustrated in the accompanying drawings.

Figure 1:
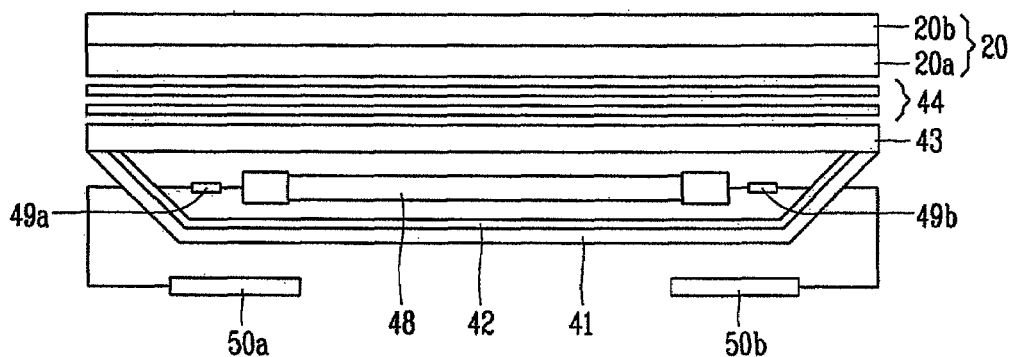
FIG. 1 is a cross-sectional view showing a structure of a direct-type liquid crystal display device according to the related art.
Figure 2:
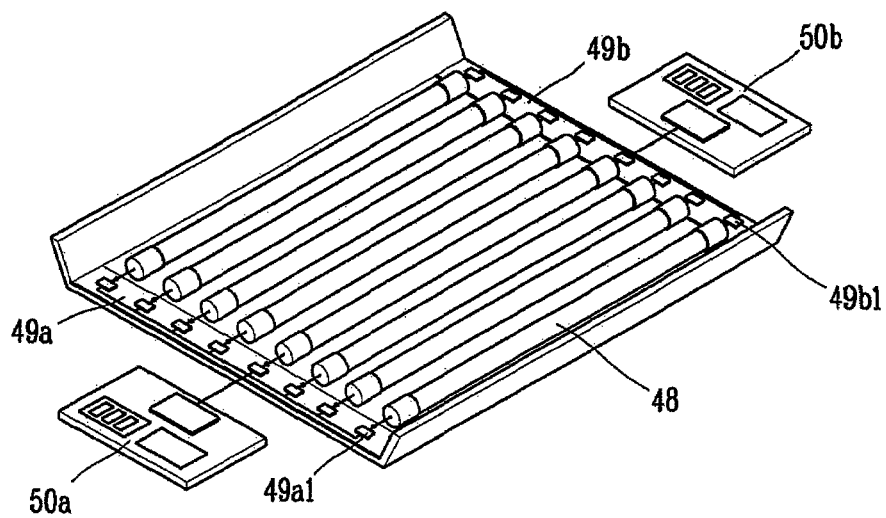
FIG. 2 is a perspective view showing a backlight unit according to the related art.
Figure 3:
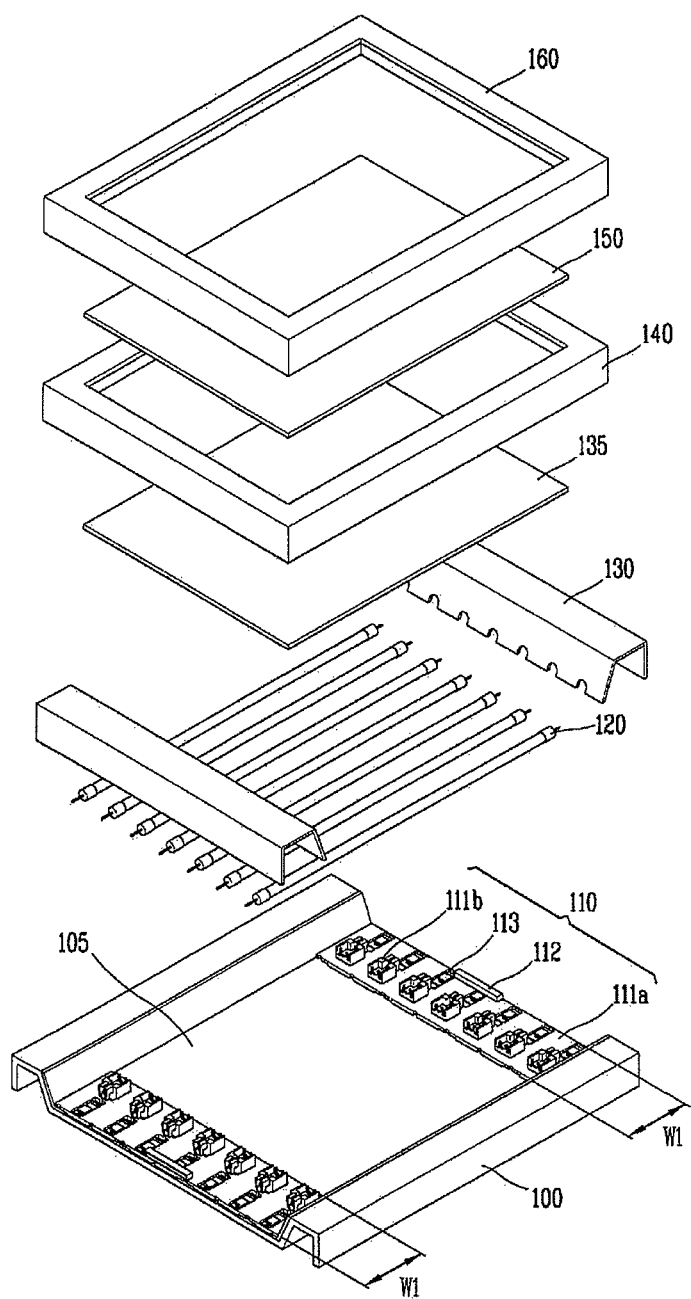
FIG. 3 is an exploded perspective view showing a direct-type liquid crystal display device according to a first embodiment of the present invention.

FIG. 3 is an exploded perspective view showing a direct-type liquid crystal display device according to a first embodiment of the present invention.

Referring to FIG. 3, the direct-type liquid crystal display device according to the first embodiment of the present invention may include a lower cover 100; a plurality of lamps 120 arranged on the lower cover 100 with a certain gap therebetween; a balance insulting member 110 disposed at both sides of the lower cover 100 and having a bottom frame 111a and lamp sockets 111b integrally formed on the bottom frame 111a so as to be coupled to the lamps 120; and a liquid crystal panel 150 disposed above the lamps 120 so as to receive light. Here, the balance insulating member 110 may include conductive electrodes formed at the lamp sockets 111b, ballast capacitors 113 disposed on the bottom frame 111a and respectively connected to the conductive electrodes, and conductive wirings formed inside the bottom frame 111a and connected to the ballast capacitors 113.

Here, the lower cover 100 may include a lower frame serving as a bottom surface formed of an aluminum (Al) or electrolytic galvanized iron (EGI) material, and a side frame vertically (or with inclination) extending from at least one edge portion of the lower frame.

The balance insulating member 110 is provided at both sides of the lower cover 100 so as to drive the lamps 120 by receiving a high AC voltage from external first and second inverters. Here, the balance insulating member 110 may include the bottom frame 111a supported by the lower cover 100 by contacting both sides of the bottom surface of the lower cover 100, and the lamp sockets 111b integrally formed on the bottom frame 111a with a certain gap therebetween such that the plurality of lamps 120 are easily arranged.

More specifically, on the bottom frame 111a of the balance insulating member 110, for instance, a connector 112 for receiving an high AC voltage from the external first and second inverters, and ballast capacitors 113 for receiving the high AC voltage so as to stably provide a current, are provided and exposed to an outside. A conductive electrode is disposed inside the lamp sockets 111b of the balance insulating member 110 such that a ballast current from the ballast capacitors 113 is stably introduced to the lamps 120. In addition, the balance insulating member 110 is provided with the conductive wirings inside the bottom frame 111a and the lamp sockets 111b. The conductive wirings are configured to electrically connect the connector 112 to one electrode portion (or one terminal) of the ballast capacitor 113, and to electrically connect another electrode portion (or another terminal) of the ballast capacitor 113 to the conductive electrode of the lamp socket 111b.

The balance insulting member 110 may be formed by an injection molding in a mold. That is, the conductive wirings are provided to the mold, and then a poly-based insulating material is injected into the mold, thereby forming the balance insulating member 110, having the conductive wirings, inside the bottom frame 111a and the lamp sockets 111b which is integrally formed on the bottom frame 111a.

Here, the conductive wirings of the balance insulating member 110 and the conductive electrodes inside the lamp sockets 111b may be formed of the same material or different material. The conductive wirings and/or conductive electrodes may be formed of at least one of conductive materials, such as Au, Ag, Cu, Al and the like. Considering manufacturing cost, the conductive wirings and/or the conductive electrodes may preferably be formed of either Cu or Al.

A reflecting plate 105 disposed between the balance insulating members 110 is attached onto the lower cover 100. The reflecting plate 105 may generally use a white polyester film or a film coated with Ag, Al and the like. Reflecting rate of a visible ray on the reflecting plate 105 is approximately 90-97%, and the thickness of the coated film is directly proportional to the reflecting rate.

On the balance insulating member 110 disposed at both sides of the lower cover 100, the plurality of the lamps 120 are coupled to the respective lamp sockets 111b arranged with a certain gap therebetween. Here, a distance between the lamps 120 coupled to the lamp sockets 111b and the reflecting plate 105 disposed below the lamps 120 is maintained within a range of approximately 5 mm. If the distance between the lamps 120 and the lower cover 100 on which the reflecting plate 105 is attached becomes shorter than 5 mm, a leakage current may severely occur from the lamps 120 due to the formation of parasitic capacitance between the lamps 120 and the lower cover 100.

In addition, a side support 130 for protecting the balance insulating member 110 is provided at both sides of the lower cover 100 where the balance insulating member 110 is disposed. Here, the side support 130 is manufactured by a press processing and may include an inclined frame (not shown) having a semicircular lamp fixing unit (no reference numeral) contacting a lower frame of the lower cover 100 with a certain inclination angle and arranging/fixing the lamps 120, a vertical frame (no reference numeral) vertically formed by being spaced from the inclined frame with a certain interval, and an upper frame (no reference numeral) formed by horizontally extending from each upper side of the inclined frame and the vertical frame.

An optical member 135 disposed above the lamps 120 by being supported at both edge portions thereof is provided on the side supports 130 provided at both sides of the lower cover 100. Here, the optical member 135 may include at least one of a diffusion plate for uniformly spreading light supplied from the lamps 120 disposed therebelow, a prism sheet for enhancing a front luminance of the light penetrated from the diffusion plate, and a protective sheet for protecting the prism sheet from an outside and increasing a viewing angle.

A main support 140 is coupled onto the optical sheet 135 so as to maintain an overall support balance of the liquid crystal display device. The main support 140, as described above, is formed to have a stepped portion such that the liquid crystal panel 150 is mounted on a front surface (or an upper side) thereof. In addition, the main support 140 is formed to have a rectangular frame (or a picture frame) having an opened central portion thereof such that the light supplied from the lamps 120 penetrates through the liquid crystal panel 150.

The liquid crystal panel 150 is mounted on the main support 140. The liquid crystal panel 150 is manufactured through multiple unit processes, and is comprised of a thin film transistor (TFT) array substrate serving as a switching device on which thin film transistors are arrayed in each unit pixel, a color filter substrate having a color filter for implementing a color, and a liquid crystal filled between the two substrates.

An upper cover 160 surrounds four edge portions of the liquid crystal panel 150 and the side surfaces of the main support 140, and is coupled by the lower cover 100 using a hook, and the like.

Figure 4:
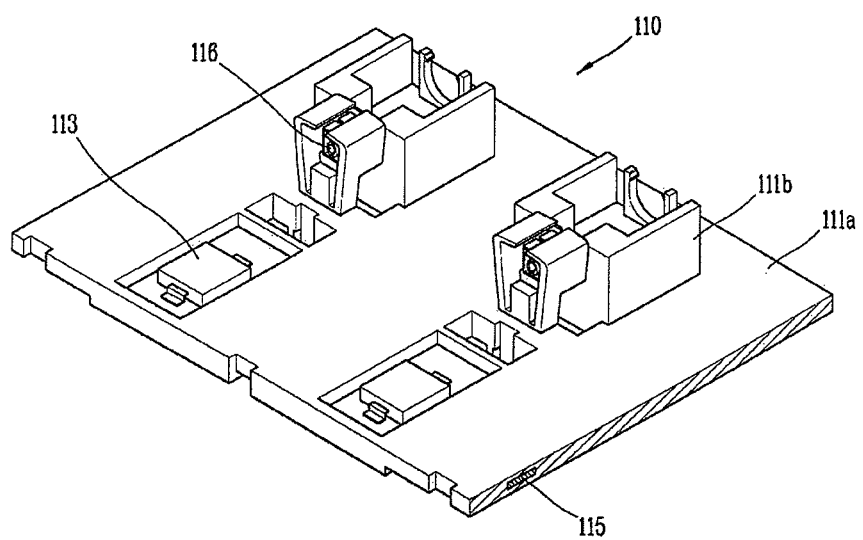
FIG. 4 is a perspective view showing a balance insulating member in FIG. 3.

FIG. 4 is a perspective view showing a balance insulating member in FIG. 3.

Referring to FIG. 4, the balance insulating member 110 may include an external frame 111a and 111b comprised of the bottom frame 111a supported by the lower cover by contacting the both sides of the lower cover, and the lamp sockets 111b integrally formed on the bottom frame 111a with a certain interval therebetween and coupled to the respective lamps; and a conductive member 115 and 116 comprised of the conductive wirings 115 formed inside the external frame 111a and 111b and/or the conductive electrodes 116. Here, the ballast capacitors 113 electrically connected to the respective lamp sockets 111b are additionally provided on the bottom frame 111a of the balance insulating member 110.

Accordingly, in the balance insulating member 110 before the ballast capacitors 113 are fixed to the bottom frame 111a, the conductive wirings 115 formed between a connector (not shown) of the balance insulating member 110 for receiving a voltage from the external first and second inverter PCBs and one electrode portion (or one terminal) of the ballast capacitor 113 and the conductive wirings 115 formed between the conductive electrode 116 of the lamp socket 111b and another electrode portion (or another terminal) of the ballast capacitor 113 are substantially in an electrical insulating state.

From such insulating state, the ballast capacitors 113 are fixed to the conductive wirings 115 exposed to an outside at a receiving recess of the bottom frame 111a, thereby enabling a stable current to be applied to the conductive electrode 116 of the lamp socket 111b through the voltage applied from an external source.

However, the liquid crystal display device in FIG. 4 according to a first embodiment of the present invention has an increased outer edge portion of a screen (i.e., bezel area) as an area of the balance insulating member 110 disposed on the lower cover 100 in FIG. 3 or a width W1 in a minor axis direction is increased, thereby substantially reducing the display area where an image is implemented.

In order to solve such problems, description of the liquid crystal display device according to a second embodiment of the present invention will be given in detail.

Figure 5:
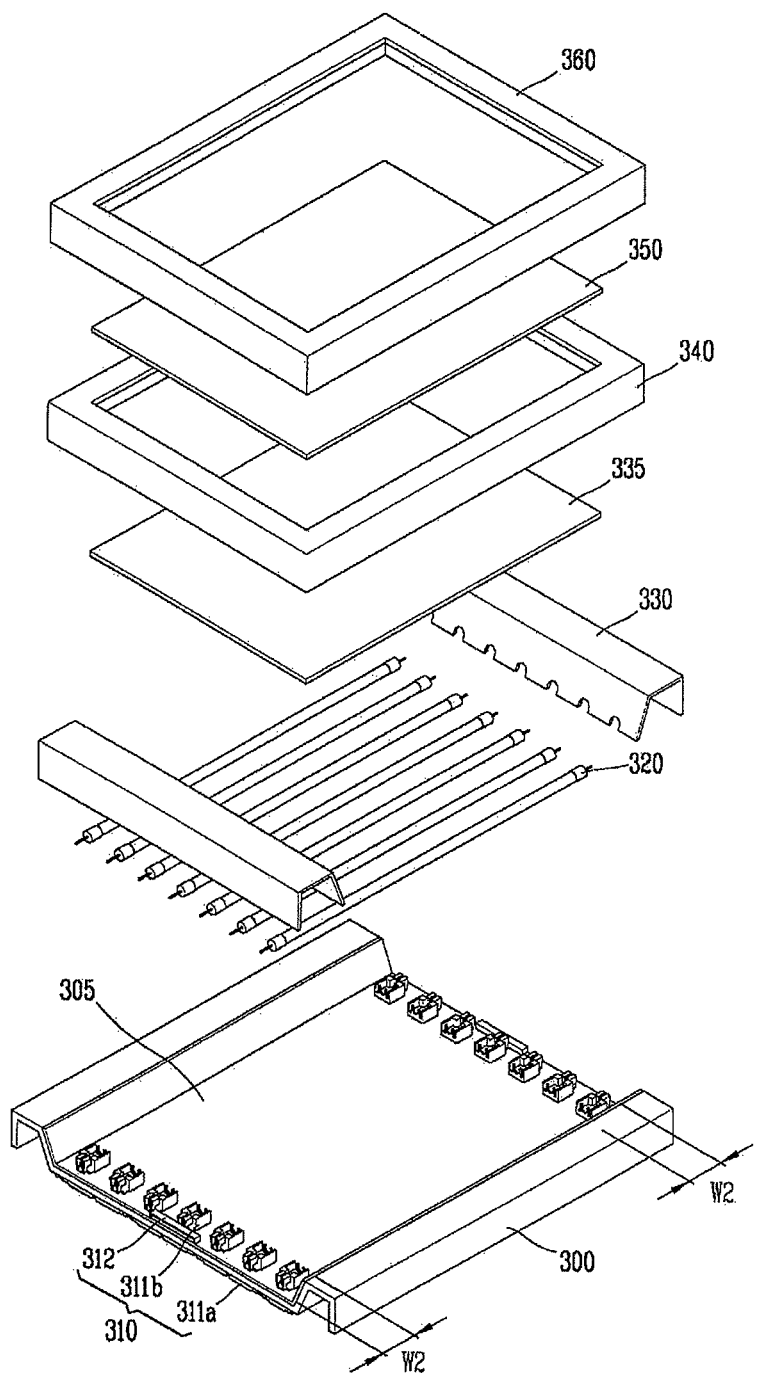
FIG. 5 is an exploded perspective view showing a direct-type liquid crystal display device according a second embodiment of the present invention.
Figure 6:
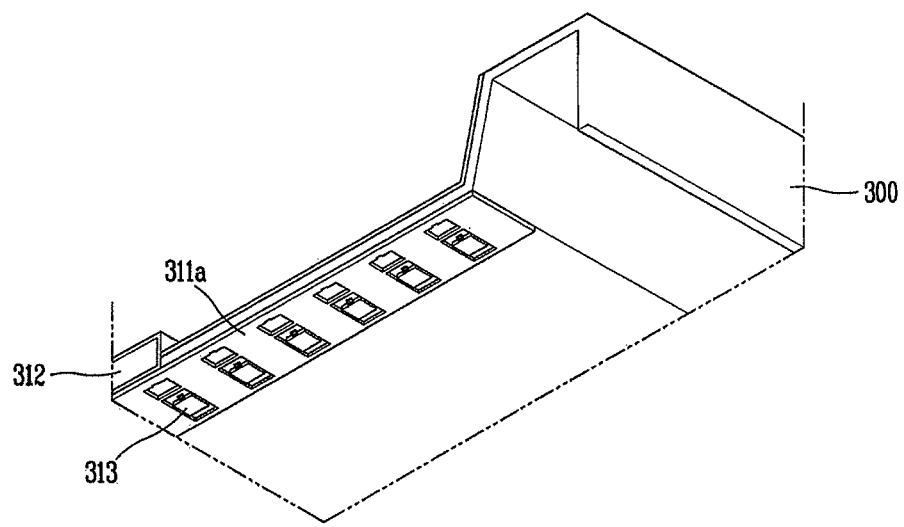
FIG. 6 is a lower perspective view showing a lower cover in FIG. 5.

FIG. 5 is an exploded perspective view showing a liquid crystal display device according a second embodiment of the present invention, and FIG. 6 is a lower perspective view showing a lower cover in FIG. 5.

Referring to FIGS. 5 and 6, the liquid crystal display device according to the second embodiment of the present invention may include a lower cover 300 having through holes at both sides thereof with a certain interval therebetween; a plurality of lamps 320 disposed above the lower cover 300 with a uniform interval; a balance insulating member 310 comprised of a bottom frame 311a disposed on a lower surface of the lower cover 300 at both sides thereof, and lamp sockets 311b integrally formed on the bottom frame 311a and coupled to the respective through holes of the lower cover 300 so as to be coupled to the lamps 320; and a liquid crystal panel 350 disposed above the lamps 320 and receiving light. Here, the balance insulating member 310 may include conductive electrodes formed at the lamp sockets 311b, ballast capacitors 313 respectively connected to the conductive electrodes and provided at a lower side of the bottom frame 311a; and conductive wirings each connected to the ballast capacitors 313 and formed inside the bottom frame 311a. Preferably, the ballast capacitors 313 are disposed of on the lower side of the bottom frame 311a in correspondence to the lamp sockets 311b.

The lower cover 300 may include a lower frame formed of Al, EGI, etc. so as to form a bottom surface, and a side frame vertically (or with inclination) extending from at least an edge portion of the lower frame. And, a plurality of through holes is formed with a certain interval therebetween at both sides of the lower frame of the lower cover 300.

The balance insulating member 310 is provided with the lamp sockets 311b which expose an outer surface thereof from both sides of the rear surface of the lower cover 300 to an upper surface of the lower cover 300 by penetrating the through holes thereof. Here, the balance insulating member 310 is comprised of the bottom frame 311a coupled (or attached) to the lower cover 300 by contacting both sides of the rear surface of the lower cover 300, and the lamp sockets 311b integrally formed on the bottom frame 311a with a certain gap therebetween and penetrating the through holes of the lower cover 300 such that its outer surface is exposed to the upper surface of the lower cover 300. Here, a plurality of lamps 320 are coupled to the respective lamp sockets 311b.

More specifically, a connector 312 for receiving a high AC voltage from external first and second inverters is provided at an edge of the bottom frame 311a of the balance insulating member 310. The ballast capacitors 313 for stably supplying a current by receiving the high AC voltage supplied to the connector 312 are exposed to the exterior of and fixed on a rear surface of the bottom frame 311a in correspondence to the lamp sockets 311b. Conductive electrodes having conductivity are provided to the lamp sockets 311b of the balance insulating member 310 such that the ballast current from the ballast capacitor 313 is stably supplied into the lamps 320. In addition, the balance insulating member 310 may include the conductive wirings inside the bottom frame 311a and the lamp sockets 311b. The conductive wirings are configured to electrically connect the connector 312 to one electrode portion (or one terminal) of the ballast capacitor 313, and another electrode portion (or another terminal) of the ballast capacitor 313 to the conductive electrodes of the lamp sockets 311b.

The balance insulating member 310 may be formed by an injection molding in a mold. That is, the conductive wirings are provided to the mold, and then a poly-based insulating material is injected into the mold, thereby forming the balance insulating member 310 having the conductive wirings inside the bottom frame 311a and the lamp sockets 311b integrally formed on the bottom frame 311a.

Here, the conductive wirings of the balance insulating member 310 and the conductive electrodes in the lamp socket 311b may be formed of the same material or different material. The conductive wirings and/or conductive electrodes may be formed of at least one of conductive materials, such as Au, Ag, Cu, Al and the like. Considering manufacturing cost, the conductive wirings and/or the conductive electrodes may preferably be formed of either Cu or Al.

A reflecting plate 305 disposed between the balance insulating members 310 each provided on both ends of the lower cover 300 is mounted on the lower cover 300. The reflecting plate 305 may use generally a white polyester film or a film coated with Ag, Al and the like. Reflecting rate of a visible ray on the reflecting plate 305 is approximately 90-97%, and the thickness of the coated film is directly proportional to the reflecting rate.

The reflecting plate 305 may not only be disposed of between the balance insulating members 310 on the lower cover 300, but also be disposed of entirely on the bottom surface of the lower cover 300 after respectively forming through holes at both sides of the balance insulating member 310 such that the lamp sockets 311b of the balance insulating member 310 penetrate.

The plurality of the lamps 320 disposed of in a certain gap are respectively coupled to the lamp sockets 311b arranged on the balance insulating member 310 disposed of at both sides of the lower cover 300. Here, a distance between the lamps 320 coupled to the lamp sockets 311b and the reflecting plate 305 disposed below the lamps 320 is maintained within a range of approximately 5 mm. If the distance between the lamps 320 and the lower cover 300 on which the reflecting plate 305 is attached becomes shorter than 5 mm, a leakage current may severely occur from the lamps 320 due to the formation of parasitic capacitance between the lamps 320 and the lower cover 300.

In addition, a side support 330 for protecting the balance insulating member 310 is provided at both sides of the lower cover 300 on which the balance insulating member 310 is disposed. Here, the side support 330 manufactured by a press processing may include an inclined frame (not shown) having a semicircular lamp fixing unit (no reference numeral) contacting a lower frame of the lower cover 300 with a certain inclination angle and arranging/fixing the lamps 320, a vertical frame (no reference numeral) vertically formed by being spaced from the inclined frame with a certain interval, and an upper frame (no reference numeral) formed by horizontally extending from the inclined frame and the vertical frame.

An optical member 335 disposed above the lamps 320 by being supported at both edge portions thereof is disposed on the side support 330 provided at both sides of the lower cover 300. Here, the optical member 335 may include at least one of a diffusion plate for uniformly spreading light supplied from the lamps 320 disposed therebelow, a prism sheet for enhancing a front luminance of the light penetrated from the diffusion plate, and a protective sheet for protecting the prism sheet from an outside and increasing a viewing angle.

A main support 340 is coupled onto the optical sheet 335 so as to maintain an overall support balance of the liquid crystal display device. The main support 340 is formed to have a stepped portion such that the liquid crystal panel 350 is mounted on a front surface (or an upper side) thereof. In addition, the main support 340 is formed to have a rectangular frame (or a picture frame) having an opened central portion thereof such that the light supplied from the lamps 320 penetrates the liquid crystal panel 350.

The liquid crystal panel 350 is mounted on an upper side surface of the main support 340 having a relatively small stepped portion. The liquid crystal panel 350 is manufactured through multiple unit processes. The liquid crystal panel 350 is comprised of a thin film transistor (TFT) array substrate serving as a switching device on which thin film transistors are arrayed in each unit pixel, a color filter substrate having a color filter for implementing a color, and a liquid crystal filled between the two substrates.

An upper cover 360 surrounds four edge portions of the liquid crystal panel 350 and the side surfaces of the main support 340, and is coupled by the lower cover 300 using a hook, and the like.

Figure 7A:
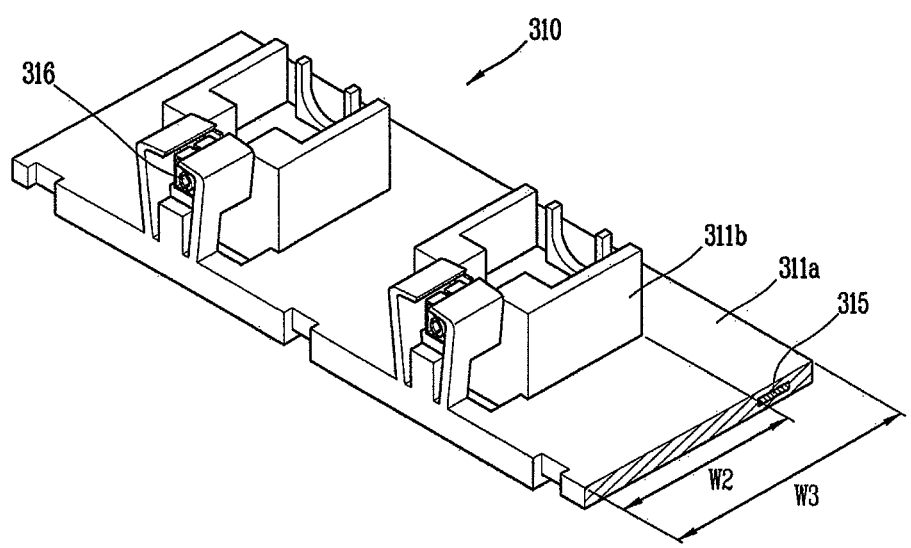
FIG. 7a is a plane perspective view showing the balance insulating member in FIG. 5.
Figure 7B:
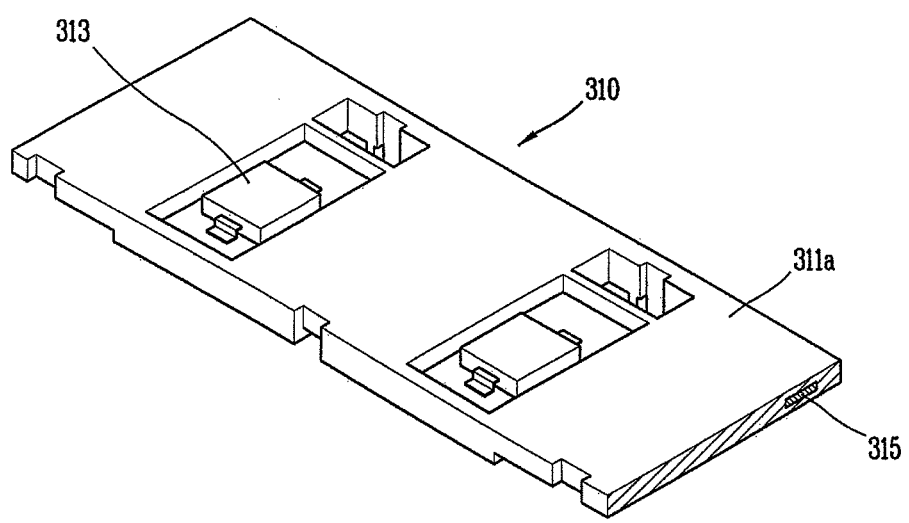
FIG. 7b is a rear perspective view showing the balance insulating member in FIG. 5.

FIG. 7a is a plane perspective view showing the balance insulating member in FIG. 5, and FIG. 7b is a rear perspective view showing the balance insulating member in FIG. 5.

Referring to FIGS. 7a and 7b, the balance insulating member 310 according to the second embodiment of the present invention may include the external frame 311a and 311b which is comprised of the bottom frame 311a contacting the both sides of the rear surface of the lower cover, and the lamp sockets 311b integrally formed on the bottom frame 311a and penetrating the through holes of the lower cover so as to be coupled to the lamps; ballast capacitors 313 disposed on a rear surface of the bottom frame 311a in correspondence to the lamp sockets 311b; and conductive wirings 315 through which transmit a high voltage applied from an external source to the ballast capacitors 313 and transmit a current supplied from the ballast capacitors 313 to the lamp sockets 311b. Here, the lamp sockets 311b may include a separate conductive electrode 316. In addition, a connector (not shown) may further be provided at one edge portion of the balance insulating member 310 so as to receive a voltage from an external source.

Accordingly, in the balance insulating member 310 before the ballast capacitors 313 are fixed to the bottom frame 311a, the conductive wiring 315 formed between a connector of the balance insulating member 310 for receiving a voltage from the external first and second inverter PCBs and one electrode portion (or one terminal) of the ballast capacitor 313 and the conductive wiring 315 formed between the conductive electrode 316 of the lamp socket 311b and another electrode portion (or another terminal) of the ballast capacitor 313 are substantially in an electrical insulating state.

From such insulating state, each of the conductive wirings 315 partially exposed to an outside at a receiving recess of the bottom frame 311a is fixed to the ballast capacitors 313, thereby enabling a stable current to be applied to the conductive electrode 316 of the lamp socket 311b through the voltage applied from the external source.

In the liquid crystal display device according to the second embodiment of the present invention as shown in FIG. 5, an outer edge portion of a screen (i.e., a bezel area) as shown in FIGS. 7a and 7b is formed in a major axis direction of the lamp, in correspondence with a length W2 of the lamp sockets 311b exposed on the lower cover. Accordingly, the bezel area is reduced, and the display area where an image is implemented is greatly increased as compared to that of in the first embodiment.

Meanwhile, in the liquid crystal display device according to another embodiment of the present invention, the ballast capacitor 113 formed between the connector 112 and the lamp socket 111b, as shown in FIG. 3, may be formed between the lamp sockets 111b. As a result, as shown in FIG. 7a, the bezel area corresponds to an area of the bottom frame 311a of the balance insulating member 310 exposed to the exterior through the lower cover or a width W3 in a minor axis direction, thereby the area being substantially reduced as compared to that of in the first embodiment of the present invention.

Therefore, descriptions of other aspects of the embodiment except for the above above aspects are substantially similar to those of the first embodiment, and detailed explanations therefore are omitted.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A liquid crystal display device, comprising:
    a lower cover;
    a plurality of lamps disposed on the lower cover with a certain interval therebetween;
    a balance insulating member disposed on an upper side and at both sides of the lower cover, the balance insulating member including a bottom frame and a plurality of lamp sockets integrally formed on the bottom frame to form a one-piece component so as to be coupled to the lamps;
    a side support disposed at both sides of the lower cover for protecting a ballast capacitors included in the balance insulating member; and
    a liquid crystal panel disposed above the lamps and which receives light,
    wherein the balance insulating member includes conductive electrodes formed at the lamp sockets, ballast capacitors each connected to the conductive electrodes and disposed on an upper side of the bottom frame, and conductive wirings formed inside the bottom frame and connected to the ballast capacitors.

2. The liquid crystal display device of claim 1, wherein the bottom frame and the lamp sockets of the balance insulating member are formed of a poly-based resin.

3. The liquid crystal display device of claim 1, wherein the conductive electrodes formed at the lamp sockets of the balance insulating member and the conductive wirings formed inside the bottom frame are formed of the same material.

4. The liquid crystal display device of claim 1, wherein the conductive electrodes formed at the lamp sockets of the balance insulating member and the conductive wirings formed inside the bottom frame are formed of at least one selected from the group consisting of Au, Ag, Cu and Al.

5. A liquid crystal display device, comprising:
    a lower cover including an upper surface and a pair of side frames extending upwardly from the upper surface, the upper surface and the pair of side frames define a receiving space;
    a plurality of lamps disposed on the lower cover with a certain interval therebetween;
    a balance insulating member completely disposed in the receiving space and on an upper side and at both sides of a lower cover, and having a bottom frame and lamp sockets integrally formed on the bottom frame so as to be coupled to the lamps;
    a side support disposed at both sides of the lower cover for protecting a ballast capacitors included in the balance insulating member; and
    a liquid crystal panel disposed above the lamps and which receives light, wherein the balance insulating member includes conductive electrodes formed at the lamp sockets, ballast capacitors each connected to the conductive electrodes and disposed between the lamp sockets and on . . . the upper side of the bottom frame, and conductive wirings formed inside the bottom frame and connected to the ballast capacitors.

6. The liquid crystal display device of claim 5, wherein the bottom frame and the lamp sockets of the balance insulating member are formed of a poly-based resin.

7. The liquid crystal display device of claim 5, wherein the conductive electrodes formed at the lamp sockets of the balance insulating member and the conductive wirings formed inside the bottom frame are formed of the same material.

8. The liquid crystal display device of claim 5, wherein the conductive electrodes formed at the lamp sockets of the balance insulating member and the conductive wirings formed inside the bottom frame are formed of at least one selected from the group consisting of Au, Ag, Cu and Al.

9. The liquid crystal display device of claim 5, wherein the ballast capacitors are formed on a lower side of the bottom frame in correspondence to the lamp sockets.

* * * * *